US012609298B2

(12) United States Patent　　　　　(10) Patent No.:　US 12,609,298 B2
Han et al.　　　　　　　　　　　　　　(45) Date of Patent:　　　Apr. 21, 2026

(54) POSITIVE ELECTRODE, ELECTROCHEMICAL DEVICE AND ELECTRONIC DEVICE THAT USES THE SAME POSITIVE ELECTRODE

(71) Applicant: Ningde Amperex Technology Limited, Ningde City (CN)

(72) Inventors: Dongdong Han, Ningde (CN); Kefai Wang, Ningde (CN); Qingwen Zhang, Ningde (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 776 days.

(21) Appl. No.: 17/710,160

(22) Filed: Mar. 31, 2022

(65) Prior Publication Data

US 2022/0223844 A1　　Jul. 14, 2022

Related U.S. Application Data

(63) Continuation of application No. PCT/CN2020/092382, filed on May 26, 2020.

(51) Int. Cl.
　H01M 4/36　　　(2006.01)
　H01M 4/131　　(2010.01)
　　　　　(Continued)

(52) U.S. Cl.
　CPC ........... H01M 4/366 (2013.01); H01M 4/131 (2013.01); H01M 4/136 (2013.01); H01M 4/525 (2013.01);
　　　　　(Continued)

(58) Field of Classification Search
　None
　See application file for complete search history.

(56) References Cited

U.S. PATENT DOCUMENTS

| | | | | |
|---|---|---|---|---|
| 2018/0006291 A1* | 1/2018 | Kim | ...................... | H01M 4/13 |
| 2020/0295354 A1* | 9/2020 | Lee | ...................... | H01M 4/38 |
| 2021/0091379 A1* | 3/2021 | Takei | .................... | H01M 4/366 |

FOREIGN PATENT DOCUMENTS

| | | |
|---|---|---|
| CN | 103779570 A | 5/2014 |
| CN | 105098193 A | 11/2015 |

(Continued)

OTHER PUBLICATIONS

First Office Action of CN application No. 202080047826.7, dated Sep. 01, 2022.

(Continued)

*Primary Examiner* — Alix E Eggerding
(74) *Attorney, Agent, or Firm* — XSENSUS LLP

(57)　　　　　ABSTRACT

A positive electrode including a positive current collector, a positive active material layer, a bonding layer and a conductive layer. The bonding layer is disposed between the positive current collector and the positive active material layer. The conductive layer is disposed between the bonding layer and the positive active material layer. The conductive layer includes a conductive agent with a weight percent of 20 wt % to 95 wt % and a binder with a weight percent of 5 wt % to 80 wt %. This helps to improve the cycle performance and the high-temperature storage performance of the electrochemical device.

20 Claims, 1 Drawing Sheet

(51) Int. Cl.

| | |
|---|---|
| *H01M 4/136* | (2010.01) |
| *H01M 4/525* | (2010.01) |
| *H01M 4/58* | (2010.01) |
| *H01M 4/62* | (2006.01) |
| *H01M 10/0525* | (2010.01) |
| *H01M 4/02* | (2006.01) |

(52) U.S. Cl.

CPC ......... *H01M 4/5825* (2013.01); *H01M 4/623* (2013.01); *H01M 4/625* (2013.01); *H01M 10/0525* (2013.01); *H01M 2004/021* (2013.01); *H01M 2004/028* (2013.01)

(56) References Cited

FOREIGN PATENT DOCUMENTS

| | | |
|---|---|---|
| CN | 107431186 A | 12/2017 |
| CN | 110364681 A | 10/2019 |
| CN | 110416490 A | 11/2019 |
| CN | 110581255 A | 12/2019 |
| EP | 3147971 A1 | 3/2017 |
| JP | 2012048892 A | 3/2012 |
| JP | 2014035886 A | 2/2014 |
| WO | 2019123932 A1 | 6/2019 |

OTHER PUBLICATIONS

Second Office Action of CN application No. 202080047826.7, dated Apr. 13, 2023.

Third Office Action of CN application No. 202080047826.7, dated Sep. 29, 2023.

Extended European Search Report of EP application No. 20937631.8, dated Jan. 25, 2023.

International Search Report and Written Opinion for Application No. PCT/CN2020/092382 mailed on Mar. 2, 2021, 6 pages.

* cited by examiner

POSITIVE ELECTRODE, ELECTROCHEMICAL DEVICE AND ELECTRONIC DEVICE THAT USES THE SAME POSITIVE ELECTRODE

CROSS REFERENCE TO THE RELATED APPLICATION

This application is a continuation under 35 U.S.C. § 120 of international patent application PCT/CN2020/092,382 filed on May 26, 2020, the entire content of which is incorporated herein by reference.

TECHNICAL FIELD

This application relates to the field of energy storage, and in particular, to a positive electrode, an electrochemical device and an electronic device that uses the same positive electrode.

BACKGROUND

Electrochemical devices (such as a lithium-ion battery) are widely used in the fields such as wearable devices, smartphones, unmanned aerial vehicles, electric vehicles, and large-scale energy storage equipment by virtue of advantages such as a high energy density, a long cycle life, and no memory effect, and have become the most promising new green chemical power source in the world today. How to enhance the safety performance and the cycle storage performance of the lithium-ion battery has become a technical issue to be solved urgently. One of the approaches to the foregoing problem is to improve an electrode plate.

In view of this, it is necessary to provide an improved positive electrode, an electrochemical device and an electronic device that uses the same positive electrode.

SUMMARY

This application provides a positive electrode, an electrochemical device and an electronic device that uses the same positive electrode to solve at least one problem in the related art to at least some extent.

According to an aspect of this application, this application provides a positive electrode. The positive electrode includes a positive current collector, a positive active material layer, a bonding layer, and a conductive layer. The bonding layer is disposed between the positive current collector and the positive active material layer. The conductive layer is disposed between the bonding layer and the positive active material layer. The conductive layer includes a conductive agent and a first binder. Based on a total weight of the conductive layer, a content of the conductive agent is 20 wt % to 95 wt %, and a content of the first binder is 5 wt % to 80 wt %.

According to an embodiment of this application, the conductive layer further includes a first positive active material. Based on the total weight of the conductive layer, a content of the first positive active material is not greater than 75 wt %.

According to an embodiment of this application, a thickness of the conductive layer is 0.01 μm to 10 μm.

According to an embodiment of this application, the bonding layer includes a second binder. The positive active material layer includes a third binder. A content of the second binder in the bonding layer is greater than a content of the third binder in the positive active material layer.

According to an embodiment of this application, the bonding layer further includes a second positive active material. The second positive active material is at least one selected from the group consisting of lithium nickel cobalt manganese oxide, lithium nickel cobalt aluminum oxide, lithium manganese oxide, lithium manganese iron phosphate, lithium vanadium phosphate, lithium vanadyl phosphate, lithium iron phosphate, lithium titanium oxide and a lithium-rich manganese-based material.

According to an embodiment of this application, the positive active material layer, the bonding layer, and the conductive layer are disposed on one side of the positive current collector.

According to an embodiment of this application, the positive active material layer, the bonding layer, and the conductive layer are disposed on both sides of the positive current collector.

According to an embodiment of this application, the conductive agent is at least one selected from the group consisting of carbon black, acetylene black, carbon nanotubes, conductive graphite and graphene.

According to an embodiment of this application, the first binder is at least one selected from the group consisting of polyvinylidene difluoride, polytetrafluoroethylene, sodium carboxymethyl cellulose, styrene butadiene rubber, polyurethane, fluorinated rubber and polyvinyl alcohol.

According to an embodiment of this application, the first positive active material is at least one selected from the group consisting of lithium cobalt oxide, lithium nickel cobalt manganese oxide, lithium iron phosphate and lithium manganese oxide.

According to another aspect of this application, this application provides an electrochemical device. The electrochemical device includes the positive electrode according to this application, a negative electrode, and an electrolytic solution.

According to still another aspect of this application, this application provides an electronic device. The electronic device includes the electrochemical device according to this application.

Additional aspects and advantages of this application will be partly described or illustrated later herein or expounded through implementation of the embodiments of this application.

BRIEF DESCRIPTION OF DRAWINGS

For ease of describing the embodiments of this application, the following outlines the drawings needed for describing the embodiments of this application. Evidently, the drawings outlined below are merely a part of embodiments in this application. Without making any creative efforts, a person skilled in the art can still obtain the drawings of other embodiments according to the structures illustrated in these drawings.

REFERENCE NUMERALS

1: Positive current collector
2: Positive active material layer
3: Bonding layer
4: Conductive layer

DETAILED DESCRIPTION

Embodiments of this application will be described in detail below. The embodiments of this application are not to be construed as a limitation on this application.

In the detailed description of embodiments and claims, a list of items referred to by using the terms such as "at least one of" may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

Figure 1:
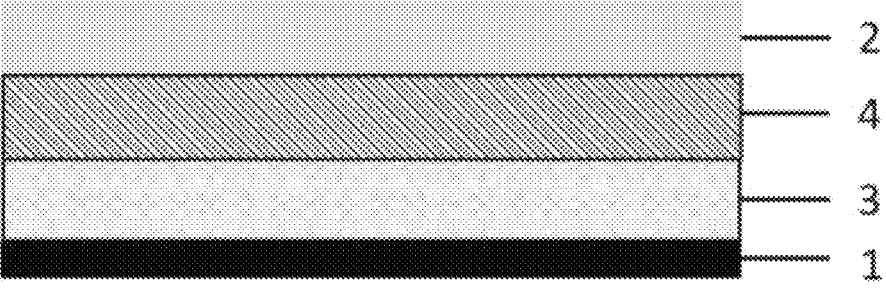
FIG. 1 is a schematic structural diagram of a positive electrode according to an embodiment of this application.

As the electrochemical devices (such as a lithium-ion battery) are used widely, more attention is paid to the storage performance and the cycle performance of the electrochemical devices. To improve both the cycle performance and the high-temperature storage performance of an electrochemical device, this application provides a positive electrode. The positive electrode includes a positive current collector, a positive active material layer, a bonding layer, and a conductive layer. The bonding layer is disposed between the positive current collector and the positive active material layer. The conductive layer is disposed between the bonding layer and the positive active material layer. The conductive layer includes a conductive agent and a first binder. Based on a total weight of the conductive layer, a content of the conductive agent is 20 wt % to 95 wt %, and a content of the first binder is 5 wt % to 80 wt %. FIG. 1 is a schematic structural diagram of a positive electrode according to an embodiment of this application. The positive electrode includes a positive current collector 1, a positive active material layer 2, a bonding layer 3, and a conductive layer 4. In some embodiments, based on the total weight of the conductive layer, the content of the conductive agent is 30 wt % to 90 wt %. In some embodiments, based on the total weight of the conductive layer, the content of the conductive agent is 30 wt % to 80 wt %. In some embodiments, based on the total weight of the conductive layer, the content of the conductive agent is 40 wt % to 70 wt %. In some embodiments, based on the total weight of the conductive layer, the content of the conductive agent is 50 wt % to 60 wt %. In some embodiments, based on the total weight of the conductive layer, the content of the conductive agent is 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or 95 wt %, or falls within a range formed by any two thereof.

In some embodiments, based on the total weight of the conductive layer, the content of the first binder is 10 wt % to 70 wt %. In some embodiments, based on the total weight of the conductive layer, the content of the first binder is 20 wt % to 60 wt %. In some embodiments, based on the total weight of the conductive layer, the content of the first binder is 30 wt % to 50 wt %. In some embodiments, based on the total weight of the conductive layer, the content of the first binder is 5 wt %, 10 wt %, 15 wt %, 20 wt %, 25 wt %, 30 wt %, 35 wt %. wt %, 40 wt %, 45 wt %, 50 wt %, 55 wt %, 60 wt %, 65 wt %, 70 wt %, 75 wt %, or 80 wt %, or falls within a range formed by any two thereof.

The conductive agent provides conductivity for the conductive layer, serves a function of connecting the interfaces on two sides of the conductive layer, and helps to improve interface resistance. The first binder in existence can bond the conductive layer to the positive current collector. When the content of the first binder in the conductive layer is relatively high (that is, the content of the conductive agent is relatively low), the conductive layer is more adhesive but less conductive. When the electrochemical device expands during cycles, the conductive agent may be detached, and consequently, the function of the conductive layer disappears. When the content of the first binder and the content of the conductive agent in the conductive layer fall within the foregoing range, there are enough conductive sites in the conductive layer, thereby preventing the conductive agent from detaching due to expansion during cycles of the electrochemical device, where the detachment may significantly reduce the cycle performance and high-temperature storage performance of the electrochemical device.

According to an embodiment of this application, the conductive layer further includes a first positive active material. Based on the total weight of the conductive layer, the content of the first positive active material is not greater than 75 wt %. In some embodiments, based on the total weight of the conductive layer, the content of the first positive active material is not greater than 70 wt %. In some embodiments, based on the total weight of the conductive layer, the content of the first positive active material is not greater than 60 wt %. In some embodiments, based on the total weight of the conductive layer, the content of the first positive active material is not greater than 50 wt %. In some embodiments, based on the total weight of the conductive layer, the content of the first positive active material is not greater than 30 wt %. In some embodiments, based on the total weight of the conductive layer, the content of the first positive active material is not greater than 20 wt %. In some embodiments, based on the total weight of the conductive layer, the content of the first positive active material is not greater than 10 wt %. In some embodiments, based on the total weight of the conductive layer, the content of the first positive active material is 5 wt %, 10 wt %, 15 wt %, 20 wt %, 25 wt %, 30 wt %, 35 wt %. wt %, 40 wt %, 45 wt %, 50 wt %, 55 wt %, 60 wt %, 65 wt %, 70 wt %, or 75 wt %, or falls within a range formed by any two thereof. When the conductive layer contains the first positive active material that accounts for the foregoing weight percent, the cycle performance and the high-temperature storage performance of the electrochemical device can be further improved.

According to an embodiment of this application, the thickness of the conductive layer is 0.01 μm to 10 μm. In some embodiments, the thickness of the conductive layer is 0.05 μm to 8 μm. In some embodiments, the thickness of the conductive layer is 0.1 μm to 6 μm. In some embodiments, the thickness of the conductive layer is 0.5 μm to 5 μm. In some embodiments, the thickness of the conductive layer is 1 μm to 3 μm. In some embodiments, the thickness of the conductive layer is 0.01 μm, 0.05 μm, 0.1 μm, 0.5 μm, 1 μm, 2 μm, 3 μm, 4 μm, 5 μm, 6 μm, 7 μm, 8 μm, 9 μm, or 10 μm, or falls within a range formed by any two thereof. When the thickness of the conductive layer falls within the foregoing range, the cycle performance and the high-temperature storage performance of the electrochemical device can be further improved.

According to an embodiment of this application, the positive active material layer, the bonding layer, and the conductive layer are disposed on one side of the positive current collector. As shown in FIG. 1, the positive active material layer 2, the bonding layer 3, and the conductive layer 4 are disposed on just one side of the positive current collector 1.

Figure 2:
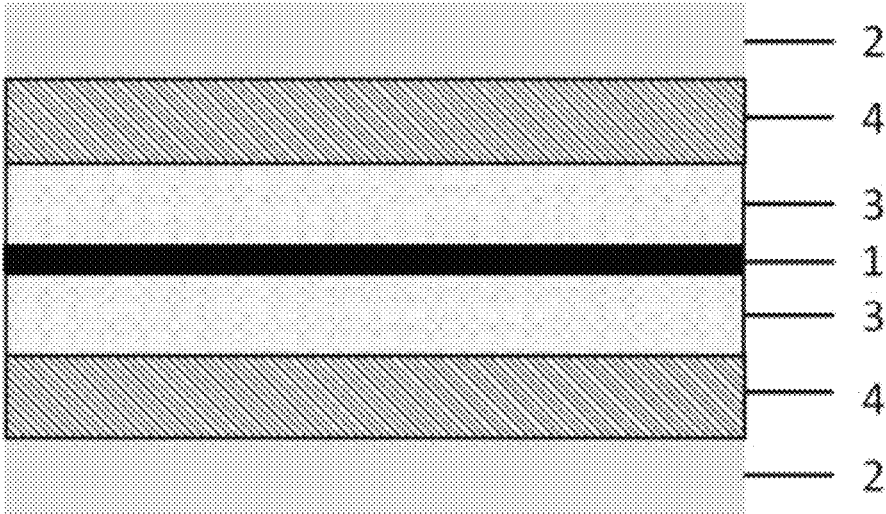
FIG. 2 is a schematic structural diagram of another positive electrode according to an embodiment of this application.

According to an embodiment of this application, the positive active material layer, the bonding layer, and the conductive layer are disposed on both sides of the positive current collector. As shown in FIG. 2, the positive active material layer 2, the bonding layer 3, and the conductive layer 4 are disposed on both sides of the positive current collector 1.

According to an embodiment of this application, the conductive agent is at least one selected from the group consisting of carbon black, acetylene black, carbon nanotubes, conductive graphite and graphene.

According to an embodiment of this application, the first binder is at least one selected from the group consisting of polyvinylidene difluoride, polytetrafluoroethylene, sodium carboxymethyl cellulose, styrene butadiene rubber, polyurethane, fluorinated rubber and polyvinyl alcohol.

According to an embodiment of this application, the first positive active material is at least one selected from the group consisting of lithium cobalt oxide, lithium nickel cobalt manganese oxide, lithium iron phosphate and lithium manganese oxide.

According to an embodiment of this application, the bonding layer includes a second binder. The positive active material layer includes a third binder. The content of the second binder in the bonding layer is greater than the content of the third binder in the positive active material layer. The high content of the binder in the bonding layer helps to increase the adhesivity of the bonding layer, and ensures a relatively high bonding force between the bonding layer and the positive current collector (an aluminum substrate), thereby preventing the bonding layer from detaching from the positive current collector when the electrochemical device is subjected to an external force. In this way, the positive current collector is prevented from directly contacting a negative active material layer, thereby reducing the short-circuit hazard. In addition, the second active material in the bonding layer possesses an appropriate internal resistance in a case of a high voltage, and can reduce an instantaneous discharge current occurring when the electrochemical device is short-circuited under an external force. In this way, the safety of the electrochemical device can be improved. The positive active material layer contains a relatively low content of binder, thereby ensuring a relatively high compacted density of the positive electrode as a whole and a relatively high content of the positive active material, and ensuring a relatively high energy density of the electrochemical device.

According to an embodiment of this application, a ratio of the content of the second binder in the bonding layer to the content of the third binder in the positive active material layer falls within a range of 1.1 to 4. According to some embodiments, the ratio of the content of the second binder in the bonding layer to the content of the third binder in the positive active material layer falls within a range of 1.5 to 3. According to some embodiments, the ratio of the content of the second binder in the bonding layer to the content of the third binder in the positive active material layer falls within a range of 2 to 2.5. According to some embodiments, the ratio of the content of the second binder in the bonding layer to the content of the third binder in the positive active material layer is 1.1, 1.5, 1.8, 2, 2.2, 2.5, 2.8, 3, 3.2, 3.5, 3.8, 4, or falls within a range formed by any two thereof. When the ratio of the content of the second binder in the bonding layer to the content of the third binder in the positive active material layer falls within the foregoing range, the bonding layer can effectively protect the positive current collector, the positive active material layer can maintain a high energy density, thereby helping to improve the safety of the electrochemical device while maintaining a high energy density.

According to an embodiment of this application, based on the total weight of the positive electrode, the content of the third binder in the positive active material layer is 0.1 wt % to 5 wt %. In some embodiments, based on the total weight of the positive electrode, the content of the third binder in the positive active material layer is 0.5 wt % to 4 wt %. In some embodiments, based on the total weight of the positive electrode, the content of the third binder in the positive active material layer is 1 wt % to 3 wt %. In some embodiments, based on the total weight of the positive electrode, the content of the third binder in the positive active material layer is 2 wt % to 2.5 wt %. In some embodiments, based on the total weight of the positive electrode, the content of the third binder in the positive active material layer is 0.1 wt %, 0.5 wt %, 1 wt %, 1.5 wt %, 2 wt %, 2.5 wt %, 3 wt %, 3.5 wt %, 4 wt %, 4.5 wt %, or 5 wt %, or falls within a range formed by any two thereof.

According to an embodiment of this application, based on the total weight of the positive electrode, the content of the second binder in the bonding layer is 0.11 wt % to 20 wt %. According to some embodiments, based on the total weight of the positive electrode, the content of the second binder in the bonding layer is 0.2 wt % to 18 wt %. According to some embodiments, based on the total weight of the positive electrode, the content of the second binder in the bonding layer is 0.5 wt % to 15 wt %. According to some embodiments, based on the total weight of the positive electrode, the content of the second binder in the bonding layer is 1 wt % to 10 wt %. According to some embodiments, based on the total weight of the positive electrode, the content of the second binder in the bonding layer is 3 wt % to 5 wt %. In some embodiments, based on the total weight of the positive electrode, the content of the second binder in the bonding layer is 0.11 wt %, 0.3 wt %, 0.5 wt %, 1 wt %, 3 wt %, 5 wt %, 8 wt %, 10 wt %, 12 wt %, 15 wt %, 18 wt %, or 20 wt %, or falls within a range formed by any two thereof.

According to an embodiment of this application, the thickness of the bonding layer is 0.01 μm to 15 μm. In some embodiments, the thickness of the bonding layer is 0.05 μm to 10 μm. In some embodiments, the thickness of the bonding layer is 0.1 μm to 8 μm. In some embodiments, the thickness of the bonding layer is 0.5 μm to 5 μm. In some embodiments, the thickness of the bonding layer is 1 μm to 3 μm. In some embodiments, the thickness of the bonding layer is 1 μm to 2 μm. In some embodiments, the thickness of the bonding layer is 0.01 μm, 0.05 μm, 0.1 μm, 0.5 μm, 1 μm, 2 μm, 3 μm, 4 μm, 5 μm, 6 μm, 7 μm, 8 μm, 9 μm, 10 μm, 11 μm, 12 μm, 13 μm, 14 μm, or 15 μm, or falls within a range formed by any two thereof.

According to an embodiment of this application, the second binder includes at least one of polyvinylidene difluoride, poly(vinylidene difluoride-co-fluorinated olefin), polytetrafluoroethylene, sodium carboxymethyl cellulose, styrene butadiene rubber, polyurethane, fluorinated rubber, or polyvinyl alcohol.

According to an embodiment of this application, the third binder is the same as or different from the second binder.

According to an embodiment of this application, the bonding layer further includes a second positive active material. The second positive active material is at least one selected from the group consisting of lithium nickel cobalt manganese oxide, lithium nickel cobalt aluminum oxide, lithium manganese oxide, lithium manganese iron phosphate, lithium vanadium phosphate, lithium vanadyl phosphate, lithium iron phosphate, lithium titanium oxide and a lithium-rich manganese-based material. In some embodiments, the second positive active material further includes lithium cobalt oxide.

According to an embodiment of this application, the positive active material layer includes a third positive active material. The third positive active material includes at least one of lithium cobalt oxide, lithium nickel cobalt manganese oxide, lithium nickel cobalt aluminum oxide, lithium manganese oxide, lithium manganese iron phosphate, lithium vanadium phosphate, lithium vanadyl phosphate, lithium iron phosphate, lithium titanium oxide, or a lithium-rich manganese-based material.

According to an embodiment of this application, the positive active material layer further includes a conductive material. The positive conductive material may include any conductive material so long as the conductive material does not cause a chemical change. Examples of the positive conductive material include, but are not limited to, a carbon-based material (for example, natural graphite, artificial graphite, carbon black, acetylene black, Ketjen black, and carbon fiber), a metal-based material (for example, metal powder, metal fiber, including copper, nickel, aluminum, silver, and the like), a conductive polymer (for example, a polyphenylene derivative), and any mixture thereof. According to an embodiment of this application, the positive current collector may be, but is not limited to, aluminum (Al).

This application further provides an electrochemical device. The electrochemical device includes a positive electrode, a negative electrode, and an electrolytic solution.

Positive Electrode

The positive electrode applied to the electrochemical device according to this application possesses the structure and material described above.

Negative Electrode

A negative electrode includes a current collector and a negative active material layer disposed on the current collector. The specific type of the negative active material is not limited, and may be selected as required.

In some embodiments, the negative active material is one or more selected from the group consisting of natural graphite, artificial graphite, mesocarbon microbead (MCMB for short), hard carbon, soft carbon, silicon, a silicon-carbon composite, a Li—Sn alloy, a Li—Sn—O alloy, Sn, SnO, $SnO_2$, spinel-structured lithiated $TiO_2$—$Li_4TiO_{12}$ and a Li—Al alloy.

Examples of the carbonaceous material include, but are not limited to, crystalline carbon, non-crystalline carbon, and a mixture thereof. The crystalline carbon may be amorphous or flake-shaped, mini-flake-shaped, spherical or fibrous natural graphite or artificial graphite. The non-crystalline carbon may be soft carbon, hard carbon, mesophase pitch carbide, calcined coke, and the like.

In some embodiments, the negative active material layer may include a binder, and optionally, may further include a conductive material.

The binder strengthens bonding between particles of the negative active material and bonding between the negative active material and the current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, nylon, and the like.

The negative active material layer includes the conductive material, thereby making the electrode electrically conductive. The conductive material may include any conductive material so long as the conductive material does not cause a chemical change. Examples of the conductive material include, but are not limited to, a carbon-based material (for example, natural graphite, artificial graphite, carbon black, acetylene black, Ketjen black, and carbon fiber), a metal-based material (for example, metal powder, metal fiber, including copper, nickel, aluminum, silver, and the like), a conductive polymer (for example, a polyphenylene derivative), and any mixture thereof.

The current collector applied to the negative electrode according to this application may be a copper foil, a nickel foil, a stainless steel foil, a titanium foil, foamed nickel, foamed copper, a polymer substrate coated with a conductive metal, or any combination thereof.

Electrolytic Solution

The lithium salt applicable to the electrolytic solution according to an embodiment of this application includes, but is not limited to: an inorganic lithium salt, for example, $LiClO_4$, $LiAsF_6$, $LiPF_6$, $LiBF_4$, $LiSbF_6$, $LiSO_3F$, and $LiN(FSO_2)_2$; fluorine-containing organic lithium salt, for example, $LiCF_3SO_3$, $LiN(FSO_2)(CF_3SO_2)$, $LiN(CF_3SO_2)_2$, $LiN(C_2F_5SO_2)_2$, cyclic 1,3-hexafluoropropane disulfonamide lithium, cyclic 1,2-tetrafluoroethane disulfonamide lithium, $LiN(CF_3SO_2)(C_4F_9SO_2)$, $LiC(CF_3SO_2)_3$, $LiPF_4$ $(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, or $LiBF_2$ $(C_2F_5SO_2)_2$; and a lithium salt containing a dicarboxylic acid coordination compound, for example, lithium bis(oxalate) borate, lithium difluoro(oxalate) borate, lithium tris (oxalate) phosphate, lithium difluorobis(oxalate) phosphate, or lithium tetrafluoro(oxalate) phosphate. In addition, one of the foregoing lithium salts may be used alone, or two or more thereof may be used simultaneously. In some embodiments, the lithium salt includes a combination of $LiPF_6$ and $LiBF_4$. In some embodiments, the lithium salt includes a combination of an inorganic lithium salt such as $LiPF_6$ or $LiBF_4$ and a fluorine-containing organic lithium salt such as $LiCF_3SO_3$, $LiN(CF_3SO_2)_2$, or $LiN(C_2F_5SO_2)_2$. In some embodiments, the concentration of the lithium salt falls within a range of 0.8 mol/L to 3 mol/L, a range of 0.8 mol/L to 2.5 mol/L, a range of approximately 0.8 mol/L to approximately 2 mol/L, or a range of approximately 1 mol/L to approximately 2 mol/L. In some embodiments, the concentration of the lithium salt is approximately 1 mol/L, approximately 1.15 mol/L, approximately 1.2 mol/L, approximately 1.5 mol/L, approximately 2 mol/L, or approximately 2.5 mol/L.

Solvents applicable to the electrolytic solution according to an embodiment of this application include, but are not limited to, cyclic carbonate, chain carbonate, cyclic carboxylate, chain carboxylate, cyclic ether, chain ether, a phosphorus-containing organic solvent, a sulfur-containing organic solvent, and an aromatic fluorine-containing solvent.

In some embodiments, the cyclic carbonate includes, but is not limited to, ethylene carbonate (ethylene carbonate, EC), propylene carbonate (propylene carbonate, PC), and butylene carbonate. In some embodiments, the cyclic carbonate contains 3-6 carbon atoms.

In some embodiments, the chain carbonate includes, but is not limited to, chain carbonate such as dimethyl carbonate, ethyl methyl carbonate, diethyl carbonate (DEC), methyl n-propyl carbonate, ethyl n-propyl carbonate, and di-n-propyl carbonate; and fluorine-substituted chain carbonate, such as bis(fluoromethyl)carbonate, bis(difluoromethyl)carbonate, bis(trifluoromethyl)carbonate, bis(2-fluoroethyl)carbonate, bis(2,2-difluoroethyl)carbonate, bis(2,2,2-trifluoroethyl)carbonate, 2-fluoroethyl methyl carbonate, 2,2-difluoroethyl methyl carbonate, and 2,2,2-trifluoroethyl methyl carbonate.

In some embodiments, the cyclic carboxylate includes, but is not limited to, gamma-butyrolactone and gamma-valerolactone. In some embodiments, a part of hydrogen atoms of the cyclic carboxylate may be substituted by fluorine.

In some embodiments, the chain carboxylate includes, but is not limited to, methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, and ethyl pivalate. In some embodiments, a part of hydrogen atoms of the chain carboxylate may be substituted by fluorine. In some embodiments, the fluorine-substituted chain carboxylate includes, but is not limited to, methyl trifluoroacetate, ethyl trifluoroacetate, propyl trifluoroacetate, butyl trifluoroacetate, and 2,2,2-trifluoroethyl trifluoroacetate.

In some embodiments, the cyclic ether includes, but is not limited to, tetrahydrofuran, 2-methyl tetrahydrofuran, 1,3-dioxolane, 2-methyl1,3-dioxolane, 4-methyl 1,3-dioxolane, 1,3-dioxane, 1,4-dioxane, and dimethoxypropane.

In some embodiments, the chain ether includes, but is not limited to, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, and 1,2-ethoxymethoxyethane.

In some embodiments, the phosphorus-containing organic solvent includes, but is not limited to, trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate, and tris(2,2,3,3,3)-pentafluoropropyl) phosphate.

In some embodiments, the sulfur-containing organic solvent includes, but is not limited to, sulfolane, 2-methyl sulfolane, 3-methyl sulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, and dibutyl sulfate. In some embodiments, a part of hydrogen atoms of the sulfur-containing organic solvent may be substituted by fluorine.

In some embodiments, the aromatic fluorine-containing solvent includes, but is not limited to, fluorobenzene, difluorobenzene, trifluorobenzene, tetrafluorobenzene, pentafluorobenzene, hexafluorobenzene, and trifluoromethylbenzene.

In some embodiments, the solvent used in the electrolytic solution according to this application includes one or more of the foregoing. In some embodiments, the solvent used in the electrolytic solution according to this application includes cyclic carbonate, chain carbonate, cyclic carboxylate, chain carboxylate, and any combination thereof. In some embodiments, the solvent used in the electrolytic solution according to this application includes an organic solvent selected from groups consisting of any of: ethylene carbonate, propylene carbonate, diethyl carbonate, ethyl propionate, propyl propionate, n-propyl acetate, ethyl acetate, and any combination thereof. In some embodiments, the solvent used in the electrolytic solution according to this application includes: ethylene carbonate, propylene carbonate, diethyl carbonate, ethyl propionate, propyl propionate, gamma-butyrolactone, or any combination thereof.

Additives applicable to the electrolytic solution according to an embodiment of this application include, but are not limited to, a compound with 2 to 3 cyano groups, cyclic carbonate containing a carbon-carbon double bond, a compound containing a sulfur-oxygen double bond, and lithium difluorophosphate.

In some embodiments, the compound containing 2 to 3 cyano groups may include at least one selected from the group consisting of succinonitrile (SN), adiponitrile (ADN), ethylene glycol bis(propionitrile) ether (EDN), 1,3,5-pentanetricarbonitrile, 1,2,3-propanetricarbonitrile, 1,3,6-hexanetricarbonitrile (HTCN), 1,2,6-hexanetricarbonitrile, 1,2,3-tris(2-cyanoethoxy)propane (TCEP) and 1,2,4-tris(2-cyanoethoxy)butane.

In some embodiments, the cyclic carbonate containing a carbon-carbon double bond specifically includes, but is not limited to, at least one of: vinylene carbonate, methyl vinylene carbonate, ethyl vinylene carbonate, vinyl ethylene carbonate, or 1,2-dimethyl vinylene carbonate.

In some embodiments, the compound containing a sulfur-oxygen double bond includes, but is not limited to, at least one of: vinyl sulfate, 1,2-propylene glycol sulfate, 1,3-propane sultone, 1-fluoro-1,3-propane sultone, 2-fluoro-1,3-propane sultone, or 3-fluoro-1,3-propane sultone.

Separator

In some embodiments, a separator may be disposed between the positive electrode and the negative electrode to prevent a short circuit. The material and the shape of the separator applicable to an embodiment of this application are not particularly limited, and may be based on any technology disclosed in the prior art. In some embodiments, the separator includes a polymer or an inorganic compound or the like formed from a material that is stable to the electrolytic solution according to this application.

For example, the separator may include a substrate layer and a surface treatment layer. The substrate layer is a non-woven fabric, film or composite film, which, in each case, have a porous structure. The material of the substrate layer is at least one selected from the group consisting of polyethylene, polypropylene, polyethylene terephthalate and polyimide. Specifically, the material of the substrate layer may be a polypropylene porous film, a polyethylene porous film, a polypropylene non-woven fabric, a polyethylene non-woven fabric, or a polypropylene-polyethylene-polypropylene porous composite film.

The surface treatment layer is disposed on at least one surface of the substrate layer. The surface treatment layer may be a polymer layer or an inorganic compound layer, or a layer formed by mixing a polymer and an inorganic compound.

The inorganic compound layer includes inorganic particles and a bonding material. The inorganic particles are one or more selected from the group consisting of aluminum oxide, silicon oxide, magnesium oxide, titanium oxide, hafnium dioxide, tin oxide, ceria, nickel oxide, zinc oxide, calcium oxide, zirconium oxide, yttrium oxide, silicon carbide, boehmite, aluminum hydroxide, magnesium hydroxide, calcium hydroxide and barium sulfate. The bonding material is one or more selected from the group consisting of polyvinylidene difluoride, poly(vinylidene difluoride-co-hexafluoropropylene), polyamide, polyacrylonitrile, polyacrylate, polyacrylic acid, polyacrylate, polyvinylpyrrolidone, polyvinyl ether, poly methyl methacrylate, polytetrafluoroethylene and polyhexafluoropropylene.

The polymer layer includes a polymer. The material of the polymer is at least one selected from the group consisting of polyamide, polyacrylonitrile, acrylate polymer, polyacrylic acid, polyacrylate, polyvinylpyrrolidone, polyvinyl ether, polyvinylidene fluoride and poly(vinylidene difluoride-hexafluoropropylene).

Electrochemical Device

The electrochemical device according to this application includes any device in which an electrochemical reaction occurs. Specific examples of the electrochemical device include all kinds of primary batteries, secondary batteries, fuel batteries, solar batteries, or capacitors. In particular, the electrochemical device is a lithium secondary battery, a sodium secondary battery, a zinc secondary battery, or the like. The lithium secondary battery may include a lithium metal secondary battery, a lithium-ion secondary battery, a lithium polymer secondary battery, or a lithium-ion polymer secondary battery.

Electronic Device

Another aspect of this application provides an electronic device, including the electrochemical device according to this application. The uses of the electrochemical device according to this application are not particularly limited, and the electrochemical device may be used in any electronic device known in the prior art. In some embodiments, the electrochemical device according to this application is applicable to, but without limitation: a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The following describes preparation of a lithium-ion battery as an example with reference to specific embodiments. A person skilled in the art understands that the preparation method described in this application are merely examples. Any other appropriate preparation methods fall within the scope of this application.

Embodiments

The following describes performance evaluation of the lithium-ion batteries according to the embodiments and comparative embodiments of this application.

I. Preparing a Lithium-Ion Battery

1. Preparing a Positive Electrode

Dissolving lithium cobalt oxide ($LiCoO_2$), acetylene black (SP), and polyvinylidene difluoride (PVDF) in N-methyl pyrrolidone (NMP) at a weight ratio of 96.5:2:1.5, and stirring thoroughly and mixing evenly to obtain a positive active material layer slurry, where the solid content of the positive active material layer slurry is 72 wt %.

Dissolving the lithium iron phosphate ($LiFePO_4$), acetylene black (SP), and polyvinylidene difluoride (PVDF) in N-methyl pyrrolidone (NMP) at a weight ratio of 93:2:5, and stirring thoroughly and mixing evenly to obtain a bonding layer slurry, where the solid content of the bonding layer slurry is 70 wt %.

According to the settings in the following embodiments and comparative embodiments, mixing the conductive agent, the first binder, and the first positive active material. Adding N-methyl pyrrolidone (NMP), and stirring thoroughly and mixing evenly to obtain a conductive layer slurry, where the solid content of the conductive layer slurry is 10 wt %.

Coating the positive current collector aluminum foil with the bonding layer slurry, and drying at 85° C. to form a bonding layer. Coating the bonding layer with the conductive layer slurry, and drying at 85° C. to form a conductive layer. Then coating the conductive layer with the positive active material layer slurry, and drying at 85° C. to form a positive active material layer. Then obtaining a positive electrode after steps of cutting and tab welding.

2. Preparing a Negative Electrode

Stirring and mixing graphite, Super P, sodium carboxymethyl cellulose (CMC), and styrene butadiene rubber (SBR) thoroughly in an appropriate amount of deionized water solvent at a weight ratio of 96.4:1.5:0.5:1.6 to form a homogeneous negative slurry, where the solid content of the negative slurry is 54 wt %. Coating the negative current collector copper foil with the negative slurry, and drying at 85° C., and then performing steps of edge trimming, cutting, slitting, and drying to obtain a negative active material layer, and then performing steps of cutting and tab welding to obtain a negative electrode.

3. Preparing an Electrolytic Solution

Adding $LiPF_6$ into a solvent in a dry argon atmosphere, where the solvent is formed by mixing propylene carbonate (PC), ethylene carbonate (EC), and diethyl carbonate (DEC) at a weight ratio of 1:1:1, and mixing the mixture evenly to obtain an electrolytic solution, where the concentration of $LiPF_6$ is 1.5 mol/L.

4. Preparing a Separator

Coating a 7 μm-thick PE porous polymer film with a 3 μm-thick ceramic coating to obtain a separator.

5. Preparing a Lithium-Ion Battery

Stacking the positive electrode, the separator, and the negative electrode in sequence, winding them, and putting them into an outer package. Injecting the electrolytic solution, and performing sealing. Performing steps such as vacuum sealing, static standing, chemical formation, shaping, and capacity test to obtain a lithium-ion battery.

II. Test Methods

1. Method for Testing an Internal Resistance Rise Rate of a Lithium-Ion Battery after High-Temperature Storage Charging the lithium-ion battery at a constant current of 0.5 C until the voltage reaches 4.4 V, discharging the battery at a constant voltage of 4.4 V until the current reaches 0.025 C to make the lithium-ion battery reach a fully charged state, and testing an alternating current internal resistance R0 of the lithium-ion battery. Storing the lithium-ion battery at 85° C. for 8 hours, and testing the alternating current internal resistance R1 of the lithium-ion battery. Calculating the internal resistance rise rate of the lithium-ion battery after high-temperature storage by using the following formula:

$$\text{Internal resistance rise rate after high-temperature storage} = (R1 - R0)/R0 \times 100\%.$$

2. Method for Testing an Internal Resistance Rise Rate of a Lithium-Ion Battery after Cycles Putting a lithium-ion battery in a 45° C. thermostat. Charging the lithium-ion battery at a constant current of 0.7 C until the voltage reaches 4.4 V, discharging the battery at a constant voltage of 4.4 V until the current reaches 0.025 C to make the lithium-ion battery reach a fully charged state, and testing an alternating current internal resistance Ra of the lithium-ion battery. Then charging the lithium-ion battery at a constant current of 1.0 C until the voltage reaches 3.0 V, leaving the battery to stand for 5 minutes, charging the battery at a constant current of 0.7 C until the voltage reaches 4.4 V, discharging the battery at a constant voltage of 4.4 V until the current reaches 0.025 C, and leaving the battery to stand for 5 minutes. Repeating the foregoing process for 400 cycles, and testing the alternating current internal resistance Rb of the lithium-ion battery. Calculating the internal resistance rise rate of the lithium-ion battery after cycles by using the following formula:

$$\text{Internal resistance rise rate after cycles} = (Rb-Ra)/Ra \times 100\%.$$

III. Test Results

Table 1 shows how the conductive layer in the positive electrode affects the performance of the lithium-ion battery. No conductive layer exists in the positive electrode used in Comparative Embodiment 1. In Comparative Embodiments 2 to 5 and Embodiments 1 to 26, the thickness of the conductive layer is 2 μm.

As shown in Comparative Embodiment 1, when no conductive layer exists in the positive electrode of the lithium-ion battery, the internal resistance rise rate of the lithium-ion battery after high-temperature storage and the internal resistance rise rate of the lithium-ion battery after cycles are relatively high, and the performance is relatively low. As shown in Comparative Embodiment 2, when the positive electrode contains a conductive layer but the conductive layer contains a very high content of first binder (the content is up to 95 wt %), the internal resistance rise rate of the lithium-ion battery after high-temperature storage is very high, and the internal resistance of the lithium-ion battery after cycles plunges during the test, and the performance of the lithium-ion battery is very low. As shown in Comparative Embodiments 3 and 4, when the conductive agent in the conductive layer of the positive electrode increases but the content of the conductive agent is relatively small (less than 20 wt %), the internal resistance rise rate of the lithium-ion battery after high-temperature storage and the internal resistance rise rate of the lithium-ion battery after cycles decline to some extent, but are still relatively high, and the performance of the lithium-ion battery is relatively low. As shown in Comparative Embodiment 5, when the content of the conductive agent in the conductive layer of the positive electrode increases to more than 95 wt %, the internal resistance rise rate of the lithium-ion battery after high-temperature storage and the internal resistance rise rate of the lithium-ion battery after cycles are relatively high, and the performance is relatively low.

As shown in Embodiments 1 to 26, when a conductive layer exists in the positive electrode of the lithium-ion battery and the conductive layer contains a 20 wt % to 95 wt % conductive agent and a 5 wt % to 80 wt % first binder, the internal resistance rise rate of the lithium-ion battery after high-temperature storage and the internal resistance rise rate of the lithium-ion battery after cycles decline significantly, and the cycle performance and the high-temperature storage performance of the lithium-ion battery are improved significantly. When the content of the conductive agent in the conductive layer of the positive electrode is constant, by adding a first positive active material that is not higher than 75 wt % by weight into the conductive layer, the internal resistance rise rate of the lithium-ion battery after high-temperature storage and the internal resistance rise rate of the lithium-ion battery after cycles further decline. The results further show that different types of conductive agents, first binders and first positive active materials can achieve substantially the same effects, that is, can significantly reduce the internal resistance rise rate of the lithium-ion battery after high-temperature storage and the internal resistance rise rate of the lithium-ion battery after cycles.

TABLE 1

| | | | | | | Content of the | Performance of lithium-ion battery | |
| | | | | | | | Conductive layer | |
| | | Type of conductive agent | Content of conductive agent (wt %) | Type of first binder | Content of first binder (wt %) | Type of first positive active material | first positive active material (wt %) | Internal resistance rise rate after high-temperature storage | Internal resistance rise rate after cycles |
|---|---|---|---|---|---|---|---|---|---|
| Comparative Embodiment 1 | No | / | / | / | / | / | / | 40% | 40% |
| Comparative Embodiment 2 | Yes | SP | 5% | PVDF | 95% | / | / | 280% | N/A |
| Comparative Embodiment 3 | Yes | SP | 10% | PVDF | 90% | / | / | 60% | 70% |
| Comparative Embodiment 4 | Yes | SP | 15% | PVDF | 85% | / | / | 41% | 42% |
| Comparative Embodiment 5 | Yes | SP | 97% | PVDF | 3% | / | / | 43% | 57% |
| Embodiment 1 | Yes | SP | 20% | PVDF | 80% | / | / | 32% | 30% |
| Embodiment 2 | Yes | SP | 30% | PVDF | 70% | / | / | 12% | 10% |
| Embodiment 3 | Yes | SP | 50% | PVDF | 50% | / | / | 0% | 0% |
| Embodiment 4 | Yes | SP | 60% | PVDF | 40% | / | / | 0% | 0% |

TABLE 1-continued

| | | | | | | | Type of | Content of the | Performance of lithium-ion battery | |
| | | | | | | | first | first | | |
| | | | | | Content of first | positive | positive | Internal | Internal |
| | | | | Content of | | active | active | resistance | resistance |
| | | | Type of | conductive | Type of | first | material | material | rise rate | rise |
| | | conductive | agent | first | binder | | | after high- | rate after |
| | | agent | (wt %) | binder | (wt %) | material | (wt %) | temperature storage | cycles |
|---|---|---|---|---|---|---|---|---|---|---|
| Embodiment 5 | Yes | SP | 70% | PVDF | 30% | / | / | 0% | 0% |
| Embodiment 6 | Yes | SP | 80% | PVDF | 20% | / | / | 0% | 0% |
| Embodiment 7 | Yes | SP | 90% | PVDF | 10% | / | / | 17% | 14% |
| Embodiment 8 | Yes | SP | 95% | PVDF | 5% | / | / | 23% | 18% |
| Embodiment 9 | Yes | SP | 20% | PVDF | 5% | Lithium cobalt oxide | 75% | 29% | 27% |
| Embodiment 10 | Yes | SP | 30% | PVDF | 20% | Lithium cobalt oxide | 50% | 9% | 6% |
| Embodiment 11 | Yes | SP | 50% | PVDF | 20% | Lithium cobalt oxide | 30% | 0% | 0% |
| Embodiment 12 | Yes | SP | 60% | PVDF | 20% | Lithium cobalt oxide | 20% | 0% | 0% |
| Embodiment 13 | Yes | SP | 70% | PVDF | 20% | Lithium cobalt oxide | 10% | 0% | 0% |
| Embodiment 14 | Yes | SP | 80% | PVDF | 15% | Lithium cobalt oxide | 5% | 0% | 0% |
| Embodiment 16 | Yes | CNT | 60% | PVDF | 20% | Lithium cobalt oxide | 20% | 0% | 0% |
| Embodiment 17 | Yes | Graphene | 60% | PVDF | 20% | Lithium cobalt oxide | 20% | 0% | 0% |
| Embodiment 18 | Yes | Conductive graphite (KS-6) | 60% | PVDF | 20% | Lithium cobalt oxide | 20% | 0% | 0% |
| Embodiment 19 | Yes | SP | 60% | PTFE | 20% | Lithium cobalt oxide | 20% | 0% | 0% |
| Embodiment 20 | Yes | SP | 60% | Polyurethane | 20% | Lithium cobalt oxide | 20% | 0% | 0% |
| Embodiment 21 | Yes | SP | 60% | Fluorinated rubber | 20% | Lithium cobalt oxide | 20% | 0% | 0% |
| Embodiment 22 | Yes | SP | 60% | Polyvinyl alcohol | 20% | Lithium cobalt oxide | 20% | 0% | 0% |
| Embodiment 23 | Yes | SP | 60% | PVDF | 20% | Lithium nickel cobalt manganese oxide | 20% | 0% | 0% |
| Embodiment 24 | Yes | SP | 60% | PVDF | 20% | Lithium iron phosphate | 20% | 0% | 0% |
| Embodiment 25 | Yes | SP | 60% | PVDF | 20% | Lithium manganese iron phosphate | 20% | 0% | 0% |
| Embodiment 26 | Yes | SP | 60% | PVDF | 20% | Lithium manganese oxide | 20% | 0% | 0% |

Note:

SP is acetylene black; PVDF is polyvinylidene difluoride; PTFE is polytetrafluoroethylene; and N/A means not applicable.

Table 2 shows how the thickness of the conductive layer in the positive electrode affects the performance of the lithium-ion battery. The settings in Embodiments 27 to 33 are the same as the settings in Embodiment 5 except the thickness of the conductive layer.

TABLE 2

| | Performance of lithium-ion battery | | | |
| | Thickness of conductive layer (µm) | Internal resistance rise rate after high-temperature storage | Residual capacity rate after high-temperature storage | Internal resistance rise rate after cycles |
| --- | --- | --- | --- | --- |
| Embodiment 5 | 2 | 0% | 0% | 0% |
| Embodiment 27 | 0.05 | 40% | 0% | 41% |
| Embodiment 28 | 0.01 | 12% | 0% | 19% |
| Embodiment 29 | 1 | 0% | 0% | 0% |
| Embodiment 30 | 3 | 0% | 0% | 0% |
| Embodiment 31 | 5 | 0% | 0% | 0% |
| Embodiment 32 | 10 | 0% | 0% | 0% |
| Embodiment 33 | 15 | 24% | 3% | 15% |

The results show that when the thickness of the conductive layer falls within the range of 0.01 µm to 10 µm, the internal resistance rise rate of the lithium-ion battery after high-temperature storage, the capacity loss rate after high-temperature storage, and the internal resistance rise rate of the lithium-ion battery after cycles can further decline.

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments". "in an embodiment", "in one embodiment", "in another example", "in an example", "in a specific example", or "example", do not necessarily refer to the same embodiment(s) or example(s) in this application. In addition, specific features, structures, materials, or characteristics herein may be combined in one or more embodiments or examples in any appropriate manner.

Although illustrative embodiments have been demonstrated and described above, a person skilled in the art understands that the above embodiments are not to be construed as a limitation on this application, and changes, replacements, and modifications may be made to the embodiments without departing from the principles, or scope of this application.

What is claimed is:

1. A positive electrode, comprising:
a positive current collector, a positive active material layer, a bonding layer and a conductive layer;
wherein the bonding layer is disposed between the positive current collector and the positive active material layer, the conductive layer is disposed between the bonding layer and the positive active material layer, the conductive layer comprises a conductive agent and a first binder; and
based on a total weight of the conductive layer, a content of the conductive agent is 40 wt % to 85 wt % and a content of the first binder is 15 wt % to 60 wt %.

2. The positive electrode according to claim 1, wherein the conductive layer further comprises a first positive active material; and based on the total weight of the conductive layer, a content of the first positive active material is not greater than 75 wt %.

3. The positive electrode according to claim 2, wherein the first positive active material is at least one selected from the group consisting of lithium cobalt oxide, lithium nickel cobalt manganese oxide, lithium iron phosphate and lithium manganese oxide.

4. The positive electrode according to claim 1, wherein a thickness of the conductive layer is 1 µm to 10 µm.

5. The positive electrode according to claim 1, wherein the bonding layer comprises a second binder, the positive active material layer comprises a third binder, and a content of the second binder in the bonding layer is greater than a content of the third binder in the positive active material layer.

6. The positive electrode according to claim 1, wherein the bonding layer further comprises a second positive active material; and the second positive active material is at least one selected from the group consisting of lithium nickel cobalt manganese oxide, lithium nickel cobalt aluminum oxide, lithium manganese oxide, lithium manganese iron phosphate, lithium vanadium phosphate, lithium vanadyl phosphate, lithium iron phosphate, lithium titanium oxide and a lithium-rich manganese-based material.

7. The positive electrode according to claim 1, wherein the positive active material layer, the bonding layer and the conductive layer are disposed on one side of the positive current collector; or
the positive active material layer, the bonding layer and the conductive layer are disposed on both sides of the positive current collector.

8. The positive electrode according to claim 1, wherein the conductive agent is at least one selected from the group consisting of carbon black, acetylene black, carbon nanotubes, conductive graphite and graphene.

9. The positive electrode according to claim 1, wherein the first binder is at least one selected from the group consisting of polyvinylidene difluoride, polytetrafluoroethylene, sodium carboxymethyl cellulose, styrene butadiene rubber, polyurethane, fluorinated rubber and polyvinyl alcohol.

10. The positive electrode according to claim 1, wherein based on the total weight of the conductive layer, the content of the conductive agent is 50 wt % to 85 wt %.

11. The positive electrode according to claim 1, wherein based on the total weight of the conductive layer, the content of the conductive agent is 50 wt % to 80 wt % and the content of the first binder is 20 wt % to 50 wt %.

12. An electrochemical device, comprising a positive electrode;
the positive electrode comprises a positive current collector, a positive active material layer, a bonding layer and a conductive layer;
wherein the bonding layer is disposed between the positive current collector and the positive active material layer, the conductive layer is disposed between the bonding layer and the positive active material layer, the conductive layer comprises a conductive agent and a first binder; and
based on a total weight of the conductive layer, a content of the conductive agent is 40 wt % to 85 wt % and a content of the first binder is 15 wt % to 60 wt %.

13. The electrochemical device according to claim 12, wherein the conductive layer further comprises a first positive active material; and based on the total weight of the conductive layer, a content of the first positive active material is not greater than 75 wt %.

14. The electrochemical device according to claim 12, wherein a thickness of the conductive layer is 0.01 µm to 10 µm.

15. The electrochemical device according to claim 12, wherein the bonding layer comprises a second binder, the positive active material layer comprises a third binder, and a content of the second binder in the bonding layer is greater than a content of the third binder in the positive active material layer.

16. The electrochemical device according to claim 12, wherein the bonding layer further comprises a second positive active material; and the second positive active material is at least one selected from the group consisting of lithium nickel cobalt manganese oxide, lithium nickel cobalt aluminum oxide, lithium manganese oxide, lithium manganese iron phosphate, lithium vanadium phosphate, lithium vanadyl phosphate, lithium iron phosphate, lithium titanium oxide and a lithium-rich manganese-based material.

17. The electrochemical device according to claim 12, wherein the positive active material layer, the bonding layer and the conductive layer are disposed on one side of the positive current collector; or the positive active material layer, the bonding layer and the conductive layer are disposed on both sides of the positive current collector.

18. The electrochemical device according to claim 12, wherein based on the total weight of the conductive layer, the content of the conductive agent is 50 wt % to 85 wt %.

19. An electronic device, comprising an electrochemical device;

the electrochemical device comprises a positive electrode;

the positive electrode comprises a positive current collector, a positive active material layer, a bonding layer and a conductive layer;

wherein the bonding layer is disposed between the positive current collector and the positive active material layer, the conductive layer is disposed between the bonding layer and the positive active material layer, the conductive layer comprises a conductive agent and a first binder; and based on a total weight of the conductive layer, a content of the conductive agent is 40 wt % to 85 wt % and a content of the first binder is 15 wt % to 60 wt %.

20. The electronic device according to claim 19, wherein based on the total weight of the conductive layer, the content of the conductive agent is 50 wt % to 85 wt %.

* * * * *